US007580772B2

(12) United States Patent
Stolyar et al.

(10) Patent No.: US 7,580,772 B2
(45) Date of Patent: Aug. 25, 2009

(54) METHOD OF MEASURING A CONDITION IN A MAIL PROCESSING MACHINE USING A DIAGNOSTIC MAIL UNIT

(75) Inventors: Mark G. Stolyar, Richardson, TX (US); John D. Day, Fort Worth, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 478 days.

(21) Appl. No.: 11/320,022

(22) Filed: Dec. 28, 2005

(65) Prior Publication Data

US 2007/0150090 A1 Jun. 28, 2007

(51) Int. Cl.
*G06F 7/00* (2006.01)
*G06K 9/00* (2006.01)

(52) U.S. Cl. ...................................... 700/213; 209/584

(58) Field of Classification Search ................ 700/213, 700/230, 228; 209/584, 583, 563, 564, 933
See application file for complete search history.

(56) References Cited

U.S. PATENT DOCUMENTS

| | | | | |
|---|---|---|---|---|
| 5,984,507 | A | 11/1999 | Edens | 364/478.08 |
| 6,158,576 | A * | 12/2000 | Eagles et al. | 198/810.01 |
| 6,550,764 | B2 * | 4/2003 | Wilson et al. | 271/270 |
| 2002/0103770 | A1 | 8/2002 | Ramadei et al. | 705/406 |
| 2003/0145664 | A1 | 8/2003 | Schwarz et al. | 73/863.22 |
| 2004/0010379 | A1 | 1/2004 | Craig et al. | 702/22 |
| 2004/0245158 | A1 | 12/2004 | Redford et al. | 209/584 |
| 2005/0222708 | A1 * | 10/2005 | Wisniewski | 700/223 |
| 2007/0183927 | A1 * | 8/2007 | Swider | 422/68.1 |

* cited by examiner

*Primary Examiner*—Gene Crawford
*Assistant Examiner*—Ramya Prakasam

(57) ABSTRACT

A method for acquiring data regarding operation of a mail processing system includes the steps of configuring a diagnostic module as a mail piece, inserting the diagnostic module into a stream of mail being processed by the mail processing system, and collecting data with the diagnostic module as it travels through the mail processing machine.

20 Claims, 6 Drawing Sheets

METHOD OF MEASURING A CONDITION IN A MAIL PROCESSING MACHINE USING A DIAGNOSTIC MAIL UNIT

TECHNICAL FIELD

This invention relates to systems for acquiring data concerning the operation of postal sorting equipment during sorting and processing.

BACKGROUND OF THE INVENTION

Due to the tremendous volume of mail processed daily in the United States and other countries, mail sorting equipment has become increasingly complex. Sophisticated scanning equipment along with computer controlled high speed conveying and sorting machines are used to process an ever increasing volumes of postcards, letters, magazines, parcels and other types of mail. With the added complexity has come increased difficulty in troubleshooting timing problems, mechanical component problems, sensor problems, functional problems and problems due to component wear prior to down-time events created by component failure. Unscheduled down-time is increasingly costly due to higher customer expectations regarding timely delivery and high throughput processes. Component failure can create processing errors (i.e., operation at reduced effectiveness) or create unscheduled down-time which halts production until repairs are made.

Mail processing facilities and equipment are necessarily designed having areas for which access must be restricted during processing. For example, letter processing machines have interlocked doors and covers such that run-time access is prohibited for safety and security reasons. Many areas within machines and systems cannot be viewed during operation. Additionally, in large material handling systems, it is simply not practical to provide operator access to all areas of the system.

Mail processing machinery design has generally not kept pace with technological advances in the area of on-board diagnostics and self-test capability. The level of technical skill required to troubleshoot the equipment has increased. In at least some markets, qualified maintenance and operations personnel are not available. Troubleshooting is presently a costly manual task requiring highly trained personnel. In many cases, troubleshooting involves trial and error strategies which are inefficient.

A fundamental issue related to high volume processing operations is the conflict between the desire to operate a machine and the need to halt the machine to perform needed maintenance and troubleshooting functions. Generally, maintenance managers must negotiate time with production or operations management for down-time in which to perform needed repairs. There is an element of risk that if a machine is taken down for troubleshooting and repair, it may not be available for the next processing cycle. In many cases, troubleshooting the problem requires more time than the actual repair, once the problem is known.

Costs associated with repairing machinery during scheduled down-time are inherently lower than costs associated with repairing a machine during production time. Therefore, preventive maintenance activities which identify and eliminate timing problems, failed components, or components in a state of wear which are likely to fail during the next operation interval save costly downtime.

SUMMARY OF THE INVENTION

According to the invention, a diagnostic mail unit includes a support having substantially the same shape as mail pieces being processed on a mail processing machine and sufficient flexibility to pass through the mail processing machine without causing a jam, and at least one sensor module configured to measure a condition during transit through a mail processing machine. The support may have the sensor mounted thereon, or may enclose the sensor. In a preferred embodiment, the support has two or more sensor modules mounted thereon and spaced from each other along a lengthwise dimension of the support. These sensor modules are separated by a flexible hinge capable of bending during transit around a curve in a pinch belt conveyor path of the mail processing machine.

The invention further provides a method for measuring a condition in a mail processing machine having a conveyor path through which mail pieces travel during processing. Such a method includes the steps of feeding onto the conveyor path the foregoing diagnostic mail unit, conveying the diagnostic mail unit along the conveyor path, and measuring a condition in the mail processing machine with the sensor as the diagnostic mail unit moves along the conveyor path. As will be clear from the detailed description that follows, the measured condition may be an operating characteristic of the mail processing machine itself, or an environmental condition such as the temperature of the system or the presence of a contaminant.

The diagnostic mail unit may be configured in the shape of a letter, flat or parcel or other type of mail piece, or may be incorporated into such a mail piece. The diagnostic mail unit is preferably provided with a processor, a computer memory, and a power source for powering the components of the unit. Data collected by the unit may be downloaded to a decoder and analyzed to identify system abnormalities after the unit's passage through the machine is over, or may be broadcast by a communications device without removal of the unit from the machine. These and other aspects of the invention are described further in the detailed description that follows.

BRIEF DESCRIPTION OF THE DRAWINGS

A more complete understanding of the invention may be had by reference to the following description taken in conjunction with the drawings wherein like numerals designate the same and like elements and wherein.

DETAILED DESCRIPTION

The present invention addresses some of the problems currently associated with mail sorting and processing equipment and systems. The invention provides diagnostic testing during operation of the sorting and processing equipment. Instead of shutting down a machine or series of machines for trouble-shooting, the "health" of the machine can be determined during run-time. Diagnostic modules in accordance with the invention are designed to identify component failure, functional failure, imminent failure, state of wear, or timing problems. For example, the modules can be designed to sense specific maintenance problem areas such as belt wear. The modules include an interface which allows the modules to communicate specific repair needs and instructions in a format easily understood by available technicians.

Modules in accordance with the invention flow through the entire mail processing system, or through a specific machine. Since the module senses machine and process conditions from the viewpoint of the material being processed during operation, access is unrestricted. Present day mail sorting and processing machines convey mail pieces according to address information, typically in the form of a barcode applied to the mail piece. Thus, labeling a data collection module with the appropriate barcode and/or addressing information can send the module to a targeted area of the machine or processing system. Unlike technicians or operations troubleshooters who are restricted to a single facility, location or territory, modules in accordance with the invention can move within the process anywhere mail is received, processed, or delivered. Problem areas outside the mail path (though in the local area) can be identified by the modules through communication with active or passive sensors during processing. Information collected by the module for a given machine or process, may also provide statistical data which can be used in operations research or predictive maintenance.

Figure 1:
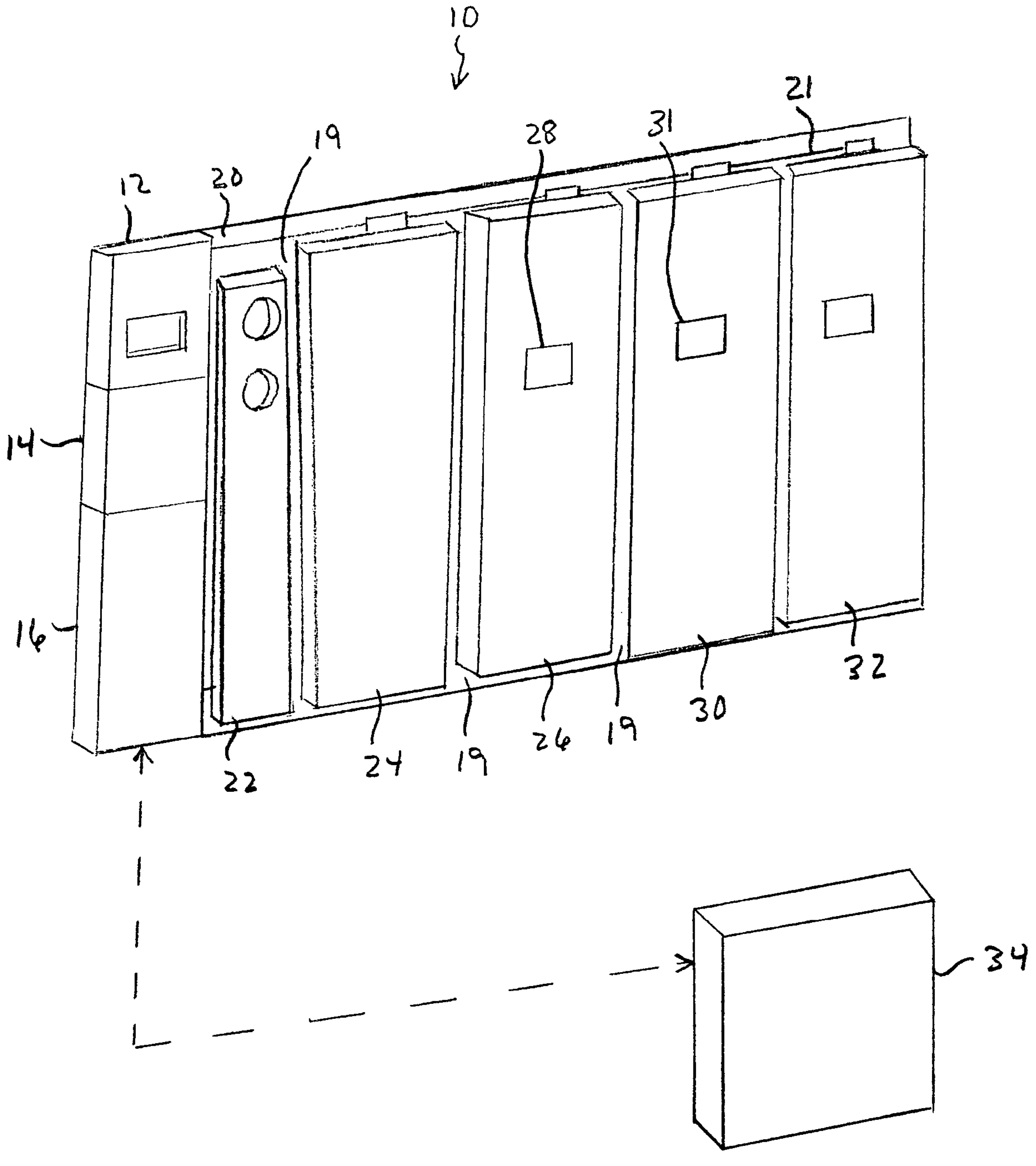
FIG. 1 is a perspective view of a diagnostic module and decoder in accordance with the invention.

Referring now to FIG. 1, a diagnostic mail unit 10 includes a series of components or modules selected by the user to meet user data acquisition requirements. Unit 10 is in the shape of a letter, flat, parcel or other type of mail piece to be sent through the mail processing machine of interest, depending upon the particular application. Specific components may be used in combinations to meet user data acquisition requirements. For example, data can be stored in on-board memory and can be sent via a wireless transmitter to a decoder, other DM's, or sensors. Other components such as an RFID reader can be incorporated to read the identity of the machine at induction to associate the data with that specific machine. Once configured, unit 10 is inserted into a mail stream to collect the desired information as the unit is conveyed through the machine or system.

In the illustrated embodiment, unit 10 includes a data processing module 12 including a microprocessor 14 with a built-in clock, a communications device 16 and a memory 18 mounted on a flat, flexible support 20 that incorporates a backplane 21 capable of accepting and/or interfacing with sensor modules. A power module 22, for example a rechargeable battery, powers the various components of unit 10. Support 20 is sufficiently flexible so that unit 10 can go through curves and gates in the conveyor system without jamming and may be made of flexible or segmented composite material or polymer. Diagnostic modules 24, 26, 30 and 32 described hereafter are preferably separated by narrow flexible segments 19 of support 20, allowing unit 10 to bend at segments 19 during transport to the extent necessary. In the alternative, support 21 can be made of rigid sections such as pieces of circuit board substrate connected side by side by flexible plastic hinges forming segments 19. Redford et al. U.S. Patent Publication 20040245158, Dec. 9, 2004, describes the problems associated with excessive stiffness and thickness of mail pieces moving through mail sorting systems.

To evaluate the condition and status of a mail processing unit, it may be desirable to measure the orientation and physical forces applied to a mail piece as it travels through the machine. A kinetic sensor 24 is provided to sense and/or measure specific parameters of interest such as velocity, acceleration, shock, pitch, roll and yaw. Kinetic sensor 24 can be used by microprocessor 14 to determine the position of the unit in the system path based on the starting location and time, velocity, and time of an event such as a measurement, where it is desired to know where along the system mail path the event occurred. To monitor the condition and wear of transport belts that transport mail pieces during processing, a belt thickness sensor 26 may be included in unit 10. As illustrated, belt thickness sensor 26 includes a sensor window 28 for directly or indirectly measuring belt thickness. For this purpose sensor 25 can generate ultrasonic pulse echo to measure belt thickness. Another alternative is a laser sensor that reads the gap dimension created by the belt thickness against a slider plate or roller.

In some cases, mail processing machines include light sources and photocells to monitor parameters such as speed and to activate devices such as diverters. Unit 10 may also include a light barrier input module 30 for acquiring timing and functional data as the module travels through one or more mail processing machines. Light barrier module 30 is provided with one or more sensors such as photocell 31 to sense when unit 10 passes through a light barrier. Light barrier input module 30 may acquire information from existing light barriers or from dedicated light sources installed specifically for the purpose of enabling unit 10 to measure specific parameters.

Unit 10 may also include a chemical/biological detection module 32 designed to collect samples for offline analysis. Alternatively or in addition, continuous monitoring for certain contaminants may be done. Upon detection of such contaminants, the time of the event and location of unit 10 are recorded.

A decoder 34 receives data and information collected by unit 10. Decoder 34 is a computer based data analysis unit, having specialized software to receive and analyze data downloaded from DM modules. The information may be transmitted from unit 10 continuously or intermittently via a wireless signal from communications device 16. Alternatively, unit 10 may collect and store data as it travels thorough a selected machine, system or portions of a mail processing or sorting system. After unit 10 has traveled through the selected machine or system, the module is retrieved and connected to decoder 34 to download the collected data. Decoder 34 may be programmed to provide specific recommendations useful to maintenance or operations based on the collected data.

Figure 2:
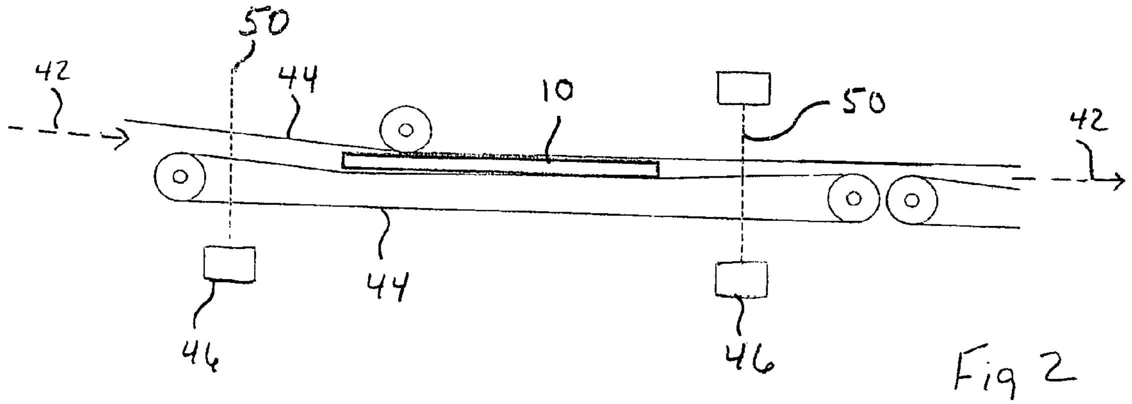
FIG. 2 is a top view of a diagnostic module in accordance with the invention positioned between opposed belt conveyors.
Figure 3:
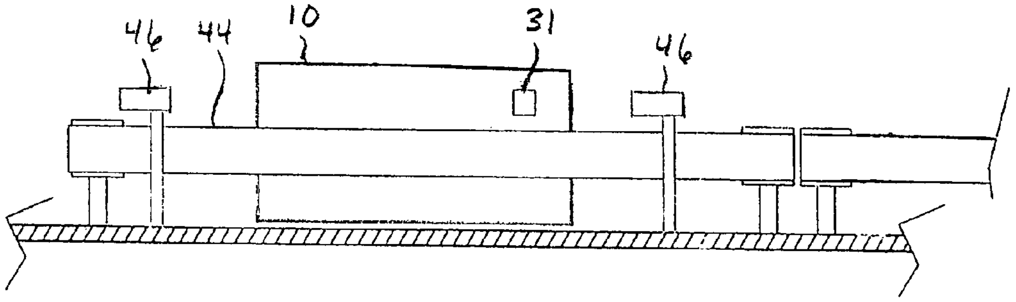
FIG. 3 is a side view of the module of FIG. 2.

Referring to FIGS. 2 and 3, a data collection unit 10 is depicted traveling along a mail processing path 42 between a pair opposed conveyor belts 44 of a pinch belt conveyor in a mail processing machine such as a DBCS or MLOCR sorter. One or more barrier light sensors 46 positioned adjacent belts 44 detects leading or trailing edge of mail pieces traveling through the system. When the barrier light beam (laser, infrared, other) strikes photocell 31, a discrete event is logged. Data collected provide function and timing information useful in troubleshooting. For example, the timing information can be compared with previous runs to measure variation in speed for a given machine section. A significant variation in the amount of time required for unit 40 to traverse the machine section could indicate a problem requiring maintenance.

Figure 4:
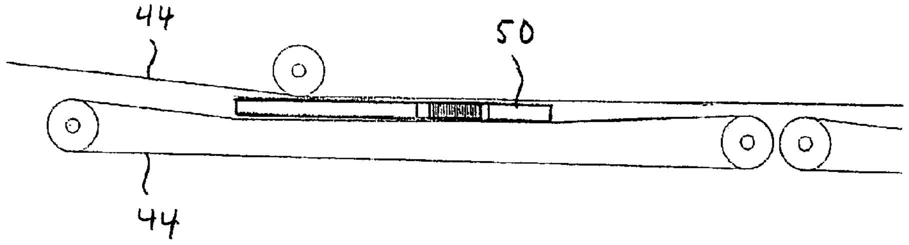
FIG. 4 is top view of a diagnostic module in accordance with the invention, positioned between opposed belt conveyors, the module including a contaminant collection unit.
Figure 5:
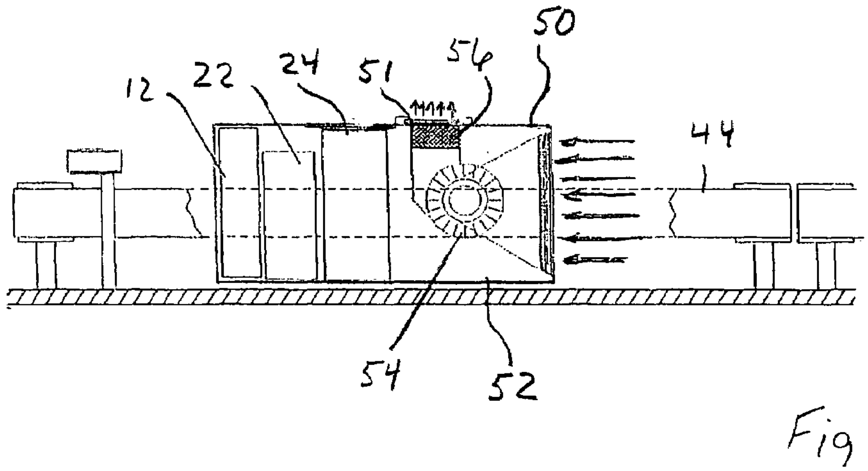
FIG. 5 is a side view of the module of FIG. 4.
Figure 6:
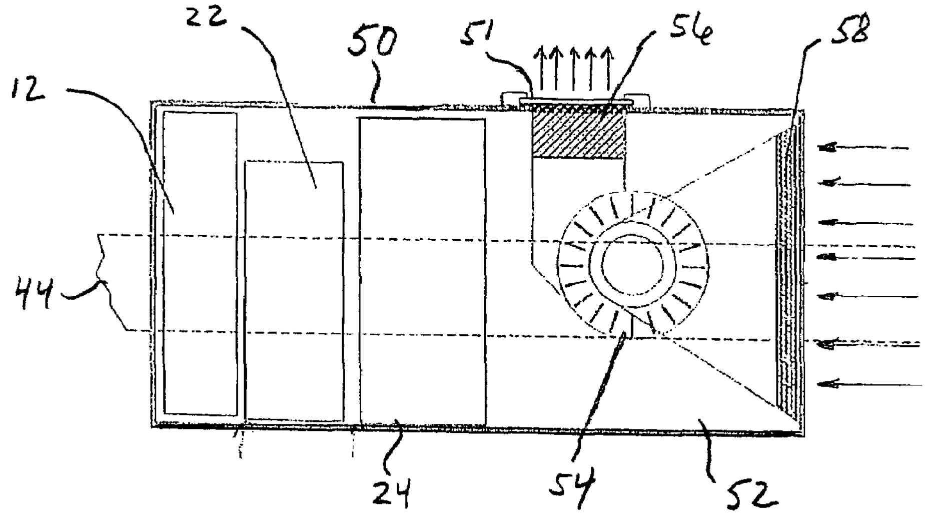
FIG. 6 is an enlarged view of the module of FIG. 4.

Referring to FIGS. 4-6, a detection unit 50 according to the invention is configured to detect the presence of chemical and/or biological contaminants in a mail processing area by means of an air filtration module 52. Module 52 is equipped with a small electrically powered blower 54 for drawing ambient air into the module and forcing the air through a conventional fiber filter media 56 as indicated by the arrows. Air entering module 52 passes through an inlet pre-screen 58 that filters out large particles and exits the module through an exhaust duct or passage 51. After unit 50 passes through the machine or machine section of interest, it is removed from the mail stream. Filter 56 is detached from unit 50 and biologic or chemical contaminants collected in filter media 56 are analyzed. A fresh filter 56 is then installed for the next use.

Figure 7:
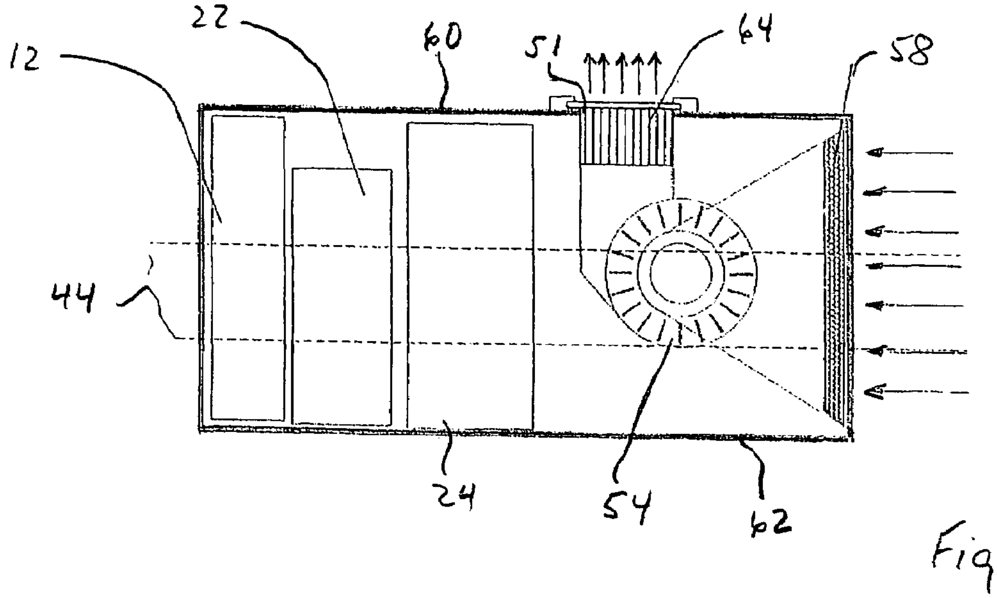
FIG. 7 is a side view of a module similar to that of FIG. 6, wherein an alternate collection media is employed.

FIG. 7 illustrates a unit 60 of the invention that includes essentially the same components as unit 50 except that fiber media filter 56 is replaced with an electrostatic filter 64. In alternate embodiments, as suggested in connection with FIG. 1, the unit may be equipped with real time contaminant sensors, similar to smoke detectors or $CO_2$ detectors, instead of collection filters. In an embodiment employing real-time contaminant filters, the location of the unit at the time the contaminant is detected may be logged by kinetic sensor 24 or another onboard sensor that monitors the location of the unit.

Figure 8:
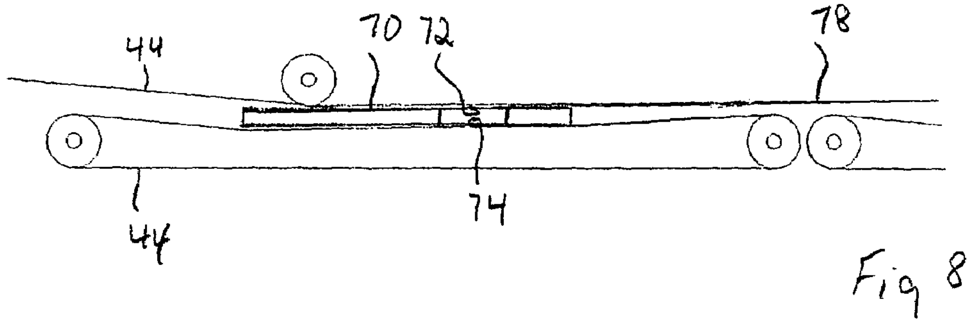
FIG. 8 is a top view of a diagnostic module in accordance with the invention positioned between opposed belt conveyors, the module including two axis laser sensors.
Figure 9:
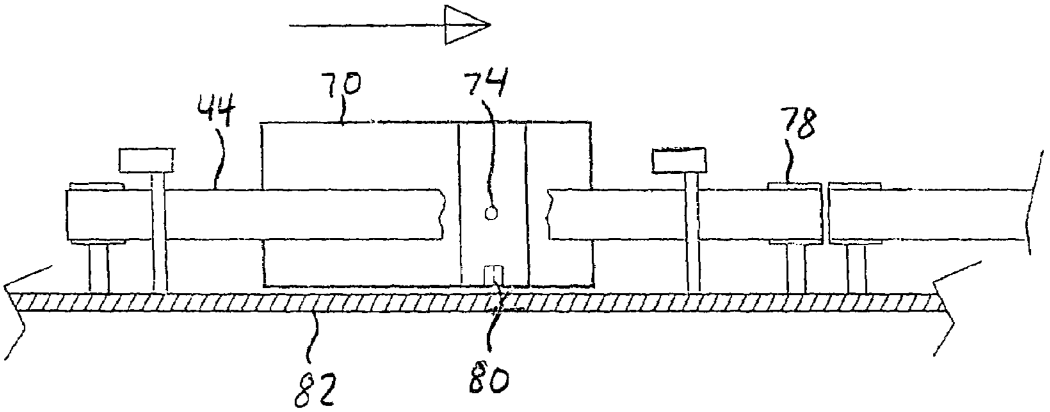
FIG. 9 is a side view of the module of FIG. 8.

Turning to FIGS. 8 and 9, in another embodiment, a unit 70 is provided with a pair of axis sensors 72, 74 based on optical mouse technology on opposite sides of the module. Sensors 72, 74 engage opposed conveyor belts 44 of a pinch belt conveyor 78 as the module is carried between the belts. Two axis sensors 72, 74 are well known devices based on optical computer mouse technology. A third two axis sensor 80 is directed downwardly towards the base 82 of belt conveyor 78. Data collected by sensors 72, 74 and 80 is logged on a real time basis as unit 70 is carried by conveyor 78. The data is used to calculate the relative velocity between belts 76 and base 82 of conveyor 78 for diagnostic purposes.

Figure 10:
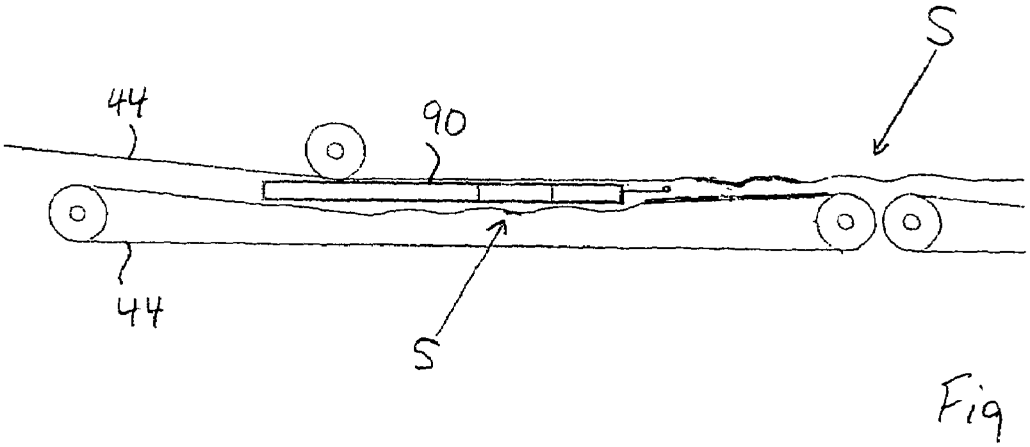
FIG. 10 is a top view of a diagnostic module in accordance with the invention positioned between opposed belt conveyors, the module including light sources and light sensors.
Figure 11:
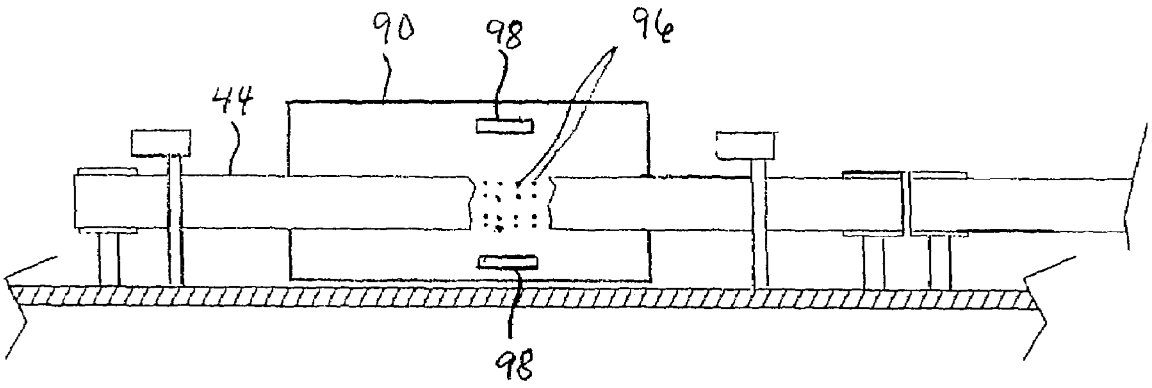
FIG. 11 is a side view of the module of FIG. 10.

Turning to FIGS. 10 and 11, a unit 90 according to the invention is used to detect conveyor belt abnormalities such as scalloping, which occurs due to localized under-tension of a conveyor belt. As illustrated in FIG. 10, scalloping results in a condition where the belt appears "wavy" when viewed edgewise or assumes a near sinusoidal shape S as indicated by the arrows. To detect scalloping, unit 90 is provided with one or more light sources 96 on one or both sides, such as an array of light emitting diodes (LEDs) mounted on module 90 at a location normally covered by opposed belts 44. Light sensors 98, located above and below belts 44, sense light emitted from LEDs 96 when the light is not blocked by belts 44. In one embodiment, each of light sensors 98 is a charge coupled device (CCD). During normal operation, belts 44 will be flat against unit 90, preventing light from LEDs 96 from escaping. If one of belts 44 scallops, light emitted by LEDs 96 is not completely blocked due to the wavy contour of the belt and is detected by sensors 98. When sensors 98 detect light, the location of the event is logged as described above, or a signal is sent to decoder 34 so that belt section can be visually inspected for wear during maintenance.

In accordance with the invention, a diagnostic mail unit may be configured with a variety of different sensors, detectors and modules having diverse functions in accordance with the needs of the end user. Such sensors, detectors and modules may include: audio/video modules, global positioning sensors (GPS), radio frequency identification modules (RFID), receivers for stationary passive or active sensors mounted on or adjacent to a mail process machine or machines, belt tension detection modules, squeeze force detection modules, temperature and humidity sensors, friction measurement devices, magnetic field detection and measurement modules, LED indicators (e.g., showing the operative state of the unit), and relative motion sensors. A unit may also be provided with an operator interface module to allow an operator to program the unit, download and upload data, and/or display data.

Figure 12:
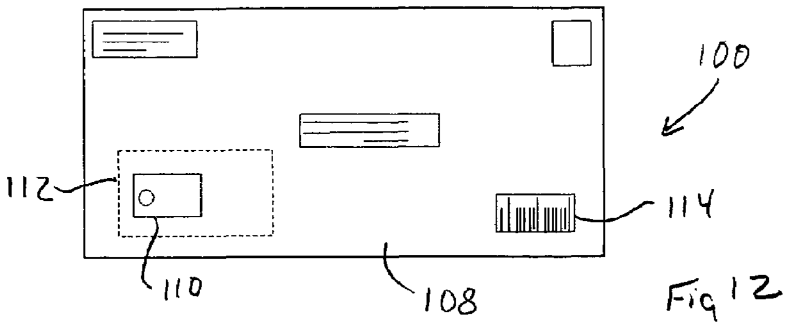
FIGS. 12-14 illustrate diagnostic modules according to the invention configured or packaged as a letter, a flat and a parcel, respectively.
Figure 13:
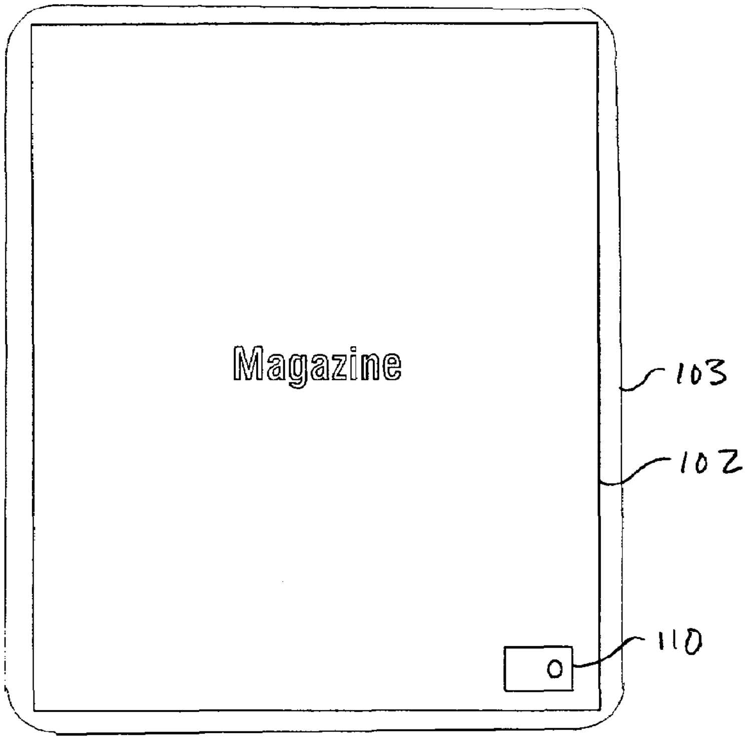
Figure 14:
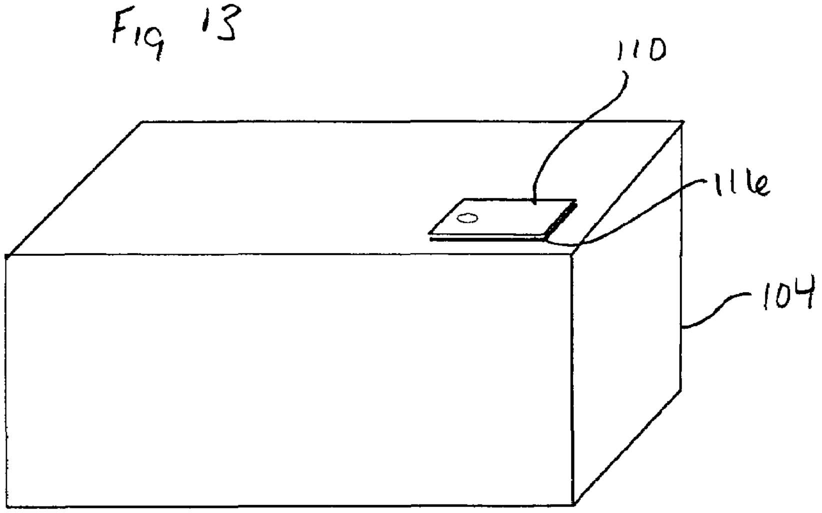

In the foregoing embodiments, the diagnostic mail unit has approximately the same dimensions as a typical mail piece of the type of the mail processing system the unit is used on, and is run through the system as if it were a mail piece, with or without an address code so that it can be sorted. Referring to FIGS. 12-14, depending upon the particular application, a unit 10 such as shown in FIG. 1, or operative portions thereof, could be incorporated into, attached to or enclosed by a larger mail piece such as a letter 100, flat 102, or parcel 104. As illustrated in FIG. 12, a unit 106 according to the invention may comprise an ordinary sealed paper envelope 108 having a generally flat sensor 110 inside it. If necessary, a transparent sensor window 112 similar to an address window may be provided so that the sensor can send or receive light as described above, and a bar code 114 may be applied to the mail piece 100 so that the mail processing equipment directs the diagnostic mail unit along a specific path, or through specific machines or machine segments to collect the desired data. In this manner, unit 106 could be fed through a series of mail processing machines in the same manner as the mail, without need to manually feed it into each successive system.

In FIG. 13, the sensor unit 110 is disposed inside a plastic bag or shrink wrap 103 for a flat 102. In FIG. 13, unit 110 is attached to a parcel 104 by means of an adhesive 1 16 or a mechanical fastener. Sensor unit 110 may be the entire combination shown in FIG. 1, or just one of the sensors if of a type capable of operating without the microprocessor, such as the contaminant collector module 52.

While this invention has been described with reference to illustrative embodiments, this description is not intended to be construed in a limiting sense. In a broad sense, the invention provides a method of diagnosis in which the data collection device is processed in the same manner as the product being processed. Use of the invention is not limited to mail processing systems, and could be extended to manufacturing wherein the diagnostic unit would be made to resemble or be part of a product being manufactured. Various other modifications and combinations of the illustrative embodiments, as well as other embodiments of the invention, will be apparent to persons skilled in the art upon reference to the description. It is, therefore, intended that the appended claims encompass any such modifications or embodiments.

The invention claimed is:

1. A method of measuring a condition in a mail processing machine having a conveyor path through which mail pieces travel during processing, comprising:

feeding onto the conveyor path a diagnostic mail unit including a support having substantially the same shape as mail pieces being processed on the mail processing machine and sufficient flexibility to pass through the mail processing machine without causing a jam, and at least one sensor module mounted on the support configured to measure a condition during transit through the mail processing machine;

conveying the diagnostic mail unit along the conveyor path; and measuring a condition in the mail processing machine with the sensor as the diagnostic mail unit moves along the conveyor path.

2. The method of claim 1, wherein the mail pieces are letters and the conveyor path is formed by a pinch belt conveyor.

3. The method of claim 1, wherein the diagnostic mail unit includes a microprocessor, a memory, a communications device and a power source, which microprocessor receives data concerning a measured condition from the sensor and stores in it the memory, and the method further comprises transmitting data from the communications device to an external decoder.

4. The method of claim 1, further comprising the step of analyzing the data to identify abnormalities in the mail processing machine.

5. The method of claim 1, further comprising the steps of: collecting particulate matter with the sensor as the diagnostic mail unit travels through the conveyor path; and analyzing the particulate matter for contaminants.

6. The method of claim 1, further comprising the step of labeling the diagnostic mail unit with a destination code such that the diagnostic mail unit is directed along a specific path through the mail processing machine.

7. The method of claim 2, wherein the sensor of the diagnostic mail unit detects conveyor belt scalloping.

8. The method of claim 1, wherein the sensor of the diagnostic mail unit detects contaminants present in the conveyor path.

9. The method of claim 1, wherein the sensor of the diagnostic mail unit measures transit time along the conveyor path.

10. The method of claim 1, wherein the sensor of the diagnostic mail unit generates data used to measure relative velocity between belts.

11. A method of measuring a condition in a mail sorting machine having a pinch belt conveyor path through which mail pieces including letters travel during processing, comprising:

feeding onto the conveyor path a diagnostic mail unit including a support having substantially the same shape as letters being processed on the mail processing machine and sufficient flexibility to pass through the mail processing machine without causing a jam, and at least one sensor module mounted on the support configured to measure a condition during transit through the mail processing machine;

conveying the diagnostic mail unit along the conveyor path;

measuring a condition in the mail processing machine with the sensor as the diagnostic mail unit moves along the conveyor path; and retrieving the diagnostic mail unit after it has traveled along the conveyor path.

12. The method of claim 11, wherein the diagnostic mail unit includes a microprocessor, a memory, a communications device and a power source further comprising steps of:

receiving data from the sensor with the microprocessor concerning a measured condition; and storing the data in the memory.

13. The method of claim 12, further comprising transmitting data from the communications device to an external decoder via a wireless signal.

14. The method of claim 12, further comprising:

after retrieval of the diagnostic unit, connecting the diagnostic mail unit to a decoder; and downloading collected data to the decoder.

15. The method of claim 11, further comprising:

labeling the diagnostic mail unit with a destination code;

sorting mail pieces transported by the pinch belt conveyor according to destination codes thereon; and directing the diagnostic mail unit along a specific path through the mail sorting machine according to the destination code on the diagnostic mail unit.

16. The method of claim 12, further comprising the step of analyzing the data to identify abnormalities in the mail sorting machine.

17. The method of claim 11, further comprising detecting belt scalloping with the sensor.

18. The method of claim 11, further comprising measuring transit time along the conveyor path with the sensor.

19. The method of claim 11, further comprising measuring relative velocity between belts with the sensor.

20. A method of measuring a condition in a mail sorting machine having a conveyor path through which mail pieces travel during processing, comprising:

feeding onto the conveyor path a diagnostic mail unit including a support having substantially the same shape as mail pieces being processed on the mail sorting machine, and at least one sensor module mounted on the support configured to measure a condition during transit through the mail processing machine, which diagnostic mail unit further includes a microprocessor, a memory, a communications device and a power source for empowering components of the diagnostic mail unit;

conveying the diagnostic mail unit along the conveyor path;

measuring a condition in the mail sorting machine with the sensor as the diagnostic mail unit moves along the conveyor path;

receiving data from the sensor with the microprocessor concerning a measured condition;

storing the data in the memory;

analyzing the data; and retrieving the diagnostic mail unit after it has traveled along the conveyor path.

* * * * *